United States Patent
Kim et al.

(10) Patent No.: US 10,105,670 B2
(45) Date of Patent: Oct. 23, 2018

(54) HEAT RECOVERY DEVICE

(71) Applicant: LG CHEM, LTD., Seoul (KR)

(72) Inventors: Tae Woo Kim, Daejeon (KR); Sung Kyu Lee, Daejeon (KR); Joon Ho Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 42 days.

(21) Appl. No.: 15/022,191

(22) PCT Filed: Sep. 17, 2014

(86) PCT No.: PCT/KR2014/008674
§ 371 (c)(1),
(2) Date: Mar. 15, 2016

(87) PCT Pub. No.: WO2015/041474
PCT Pub. Date: Mar. 26, 2015

(65) Prior Publication Data
US 2016/0231062 A1    Aug. 11, 2016

(30) Foreign Application Priority Data

Sep. 17, 2013 (KR) .................. 10-2013-0111557
Sep. 17, 2014 (KR) .................. 10-2014-0123894

(51) Int. Cl.
*B01J 19/00* (2006.01)
*B01J 10/00* (2006.01)
*B01J 19/24* (2006.01)

(52) U.S. Cl.
CPC ........... *B01J 19/0053* (2013.01); *B01J 10/00* (2013.01); *B01J 19/0013* (2013.01); *B01J 19/24* (2013.01); *B01J 2219/00029* (2013.01); *B01J 2219/00103* (2013.01); *B01J 2219/00108* (2013.01)

(58) Field of Classification Search
CPC .... B01J 19/0053; B01J 10/00; B01J 19/0013; B01J 19/24
USPC .......................................................... 165/10
See application file for complete search history.

(56) References Cited

U.S. PATENT DOCUMENTS

| | | | | |
|---|---|---|---|---|
| 2,823,650 | A | * | 2/1958 | Hedback ................. F01K 3/181 122/1 R |
| 3,293,288 | A | * | 12/1966 | Cier ........................ C07C 51/48 562/485 |
| 3,627,744 | A | * | 12/1971 | Hopkins .............. B01J 19/0013 524/733 |
| 4,074,660 | A | | 2/1978 | Tsao |
| 4,214,063 | A | * | 7/1980 | Luallin .................. B01J 8/1881 526/68 |

(Continued)

FOREIGN PATENT DOCUMENTS

| JP | 57-062391 A | 4/1982 |
|---|---|---|
| JP | 57-117784 A | 7/1982 |

(Continued)

*Primary Examiner* — Raheena R Malik
(74) *Attorney, Agent, or Firm* — Dentons US LLP (57) ABSTRACT

Disclosed are a heat recovery device and a heat recovery method. According to the heat recovery device, it is possible to recovery heat which is discontinuously generated in a batch reactor. In addition, a heat-exchanged heat exchange medium is supplied to a heat storage facility so that various kinds and a great quantity of steams can be produced, if necessary, thereby utilizing these produced steams in various industrial fields.

19 Claims, 4 Drawing Sheets (56) References Cited

U.S. PATENT DOCUMENTS

| | | | | |
|---|---|---|---|---|
| 4,369,255 A * | 1/1983 | Supp | ............... | B01J 8/0005 |
| | | | | 122/32 |
| 4,643,747 A * | 2/1987 | Becker | ............... | F22B 1/1884 |
| | | | | 122/492 |
| 4,759,313 A * | 7/1988 | Dye | ............... | C07D 301/08 |
| | | | | 122/32 |
| 5,110,508 A * | 5/1992 | Buettgen | ............... | B01D 3/009 |
| | | | | 554/167 |
| 5,869,011 A * | 2/1999 | Lee | ............... | B01J 8/025 |
| | | | | 422/200 |
| 6,162,879 A * | 12/2000 | Galewski | ............... | B01J 8/067 |
| | | | | 422/131 |
| 2001/0020529 A1 * | 9/2001 | Karl | ............... | B60H 1/00007 |
| | | | | 165/202 |
| 2002/0176812 A1 * | 11/2002 | Takai | ............... | B01J 19/0013 |
| | | | | 422/131 |
| 2007/0104626 A1 * | 5/2007 | Yonekura | ............... | B01J 19/0013 |
| | | | | 422/198 |
| 2007/0131583 A1 * | 6/2007 | Inga | ............... | C10G 2/30 |
| | | | | 208/48 AA |
| 2011/0196048 A1 * | 8/2011 | Onishi | ............... | B01J 4/002 |
| | | | | 518/700 |
| 2011/0200492 A1 * | 8/2011 | Onishi | ............... | C10G 2/32 |
| | | | | 422/187 |

FOREIGN PATENT DOCUMENTS

| | | |
|---|---|---|
| JP | 61-128071 A | 6/1986 |
| JP | 2008-143770 A | 6/2008 |
| KR | 10-0787870 B1 | 12/2007 |
| KR | 10-0900036 B1 | 6/2009 |
| WO | 90-12253 A1 | 10/1990 |

\* cited by examiner

[FIG. 1]

Operating time    Preparation time for operation

HEAT RECOVERY DEVICE

This application is a 35 USC § 371 National Stage entry of International Application No. PCT/KR2014/008674, filed on Sep. 17, 2014, and claims priority to Korean Application Nos. 10-2013-0111557, filed Sep. 17, 2013 and 10-2014-0123894, filed Sep. 17, 2014, all of which are hereby incorporated by reference in their entireties as if fully set forth herein.

TECHNICAL FIELD

The present application relates to a heat recovery device and a heat recovery method.

BACKGROUND

A batch reactor is a reactor in which a system in which a reaction occurs has a constant volume, and due to an inexpensive cost and an easy manipulation, this batch reactor has been suitably used for a reaction used to produce various kinds of products in small quantities.

In the batch reactor, an internal temperature of the reactor is continually increased due to reaction heat generated in the reaction process. Therefore, in order to secure stability and to maintain a proper reaction condition, for example, heated gas-phase reactant is discharged from the reactor and cooled by cooling water, and the cooled reactant is then circulated and re-used in the batch reactor so that the heat corresponding to the generated reaction heat is extracted from the batch reactor. In this case, nevertheless the heat source of the gas-phase reactants is energy which can be sufficiently recovered, most of the heat source is not recovered, but is discarded.

Figure 1:
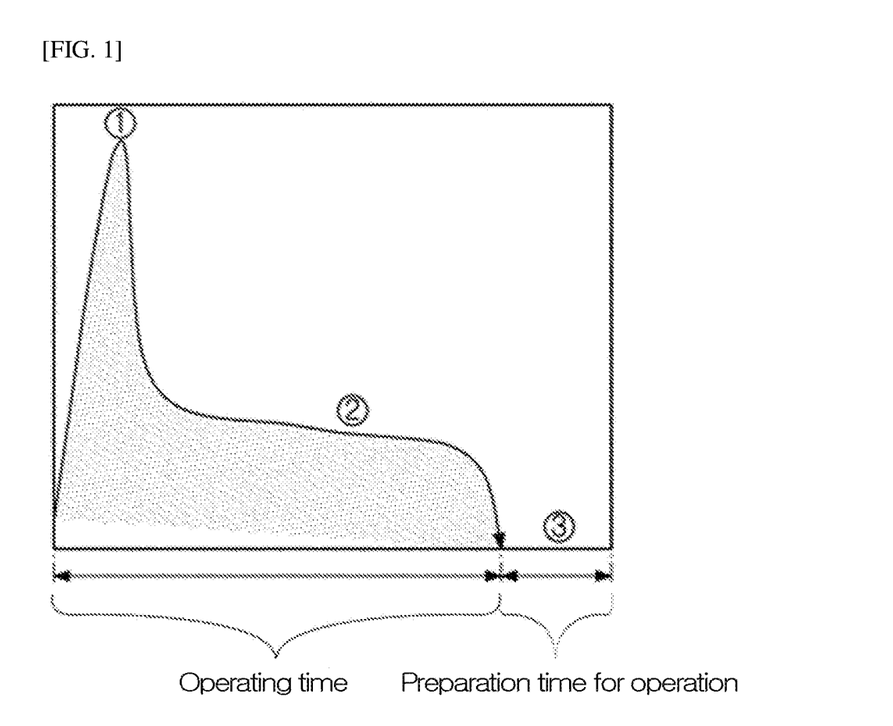
FIG. 1 is a graph typically showing an energy consumption amount according to a time in a batch reactor.

FIG. 1 is a graph typically showing an energy consumption amount according to a time in a batch reactor. In general, in the case of the batch reactor, as in FIG. 1, energy is explosively consumed at the beginning of the reaction ①. and is gradually decreased until a completion of the reaction ②. And, after the completion of the reaction, an operation of the reactor is halted until the next operation ③. Therefore, since no reaction heat is generated during the time ③ in which an operation of the reactor is halted until the next operation after the completion of the reaction, the above heat source is the heat source which is discontinuously generated so that it is not easy to use this heat source even though the heat source is recovered.

DISCLOSURE

Technical Problem

The present application provides a heat recovery device and a heat recovery method which are capable of recovering waste heat which is discontinuously generated in a batch reactor.

Technical Solution

One embodiment of the present application provides a heat recovery device. An exemplary heat recovery device can cause a stream discharged from a batch reactor to exchange heat with a heat exchange medium, for example, condensed water through a heat exchanger to recover the heat which is discontinuously generated in the batch reactor. In addition, the heat recovery device can supply the heat-exchanged heat exchange medium to a heat accumulating device to produce various kinds of steams and a great quantity of steam, if necessary, so that this steam can be used in various industrial fields. Here, the condensed water means a liquid formed by condensing vapor. For example, the condensed water is water formed when the vapor losses heat and a phase of the vapor is changed. In general, the condensed water may have a temperature which is the same as or similar to that of the vapor.

For example, various kinds of steam accumulators have been known in the industrial fields, such steam accumulators may be provided for stably supplying the steam produced in a boiler to a consumer which irregularly requires the steam. For example, in the case in which a load amount of the steam in a plant is small or the amount of the steam produced in the boiler is greater than the required amount of the steam, surplus steam is discharged to pressurized water and the stored water finally reaches a saturation temperature due to its pressure after a certain time. At this time, the water can be evaporated by surplus of the energy obtained by lowering a pressure of the water, which is in the saturation temperature state, to obtain re-evaporated steam, and a device configured to store the pressurized water is called the steam accumulator. In order to satisfy an irregular or discontinuous demand of a consumer like the above steam accumulator, the heat recovery device according to the present application does not store the steam, which is continuously produced, in the steam accumulator and does not supply the steam to a consumer, if necessary, but uses a heat source, which is discontinuously generated in a chemical process using the batch reactor, to continuously produce steam. Therefore, the present application can provide the device or the system which utilizes waste heat generated in the batch reactor to properly maintain an internal temperature condition in the batch reactor and to continuously produce the steam although a discontinuous heat source is used.

Hereinafter, the heat recovery device according to the present application will be described with reference to the accompanying drawings. Here, the drawings show exemplarily the device of the present application, the heat recovery device of the present application is not limited by the accompanying drawings.

Figure 2:
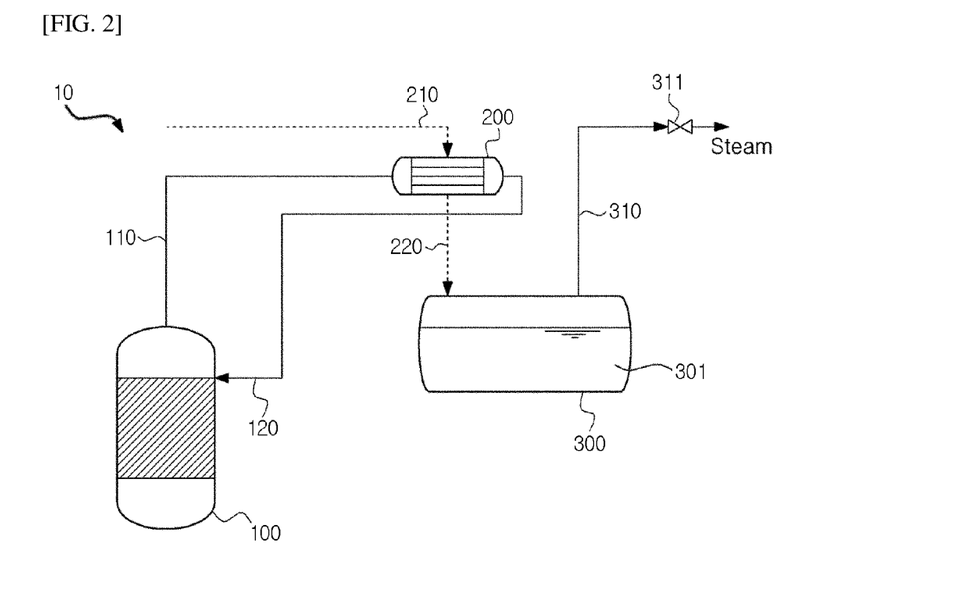
FIG. 2 is a view exemplarily showing one embodiment of a heat recovery device of the present application.

FIG. 2 is a view exemplarily showing one embodiment of a heat recovery device 10 of the present application.

In one embodiment of the heat recovery device 10 of the present application, as in FIG. 2, the heat recovery device 10 includes an insulated tank 300, a reactor 100, and a heat exchanger 200. The insulated tank 300, the reactor 100, and the heat exchanger 200 may be fluidically connected to each other to enable a fluid to flow therein, each of which includes an inlet line and an outlet line to allow the fluid to independently flow therein. For example, the reactor 100 may include a reactor outlet line 110 through which a stream discharged from the reactor 100 passes and a reactor inlet line 120 through which a stream entering the reactor 100 passes, and the heat exchanger 200 may include a heat exchanger inlet line 210 through which a stream entering the heat exchanger 200 passes and a heat exchanger outlet line 220 through which a stream discharged from the heat exchanger 200 passes. In addition, the insulated tank 300 may include an insulated tank inlet line 330 through which a stream entering the insulated tank 300 passes and an insulated tank outlet line 310 through which a stream discharged from the insulated tank 300 passes.

In one example, as long as the reactor 100 is a reactor which is capable of recovering reaction heat, the reactor is not particularly limited. As the reactor, for example, a batch reactor or a semi-batch reactor may be employed. Preferably, the batch reactor may be employed as the reactor. In the batch reactor, an extremely high reaction temperature may be maintained due to a characteristic of a closed system. Therefore, in a case in which the batch reactor is used, it is possible to secure a heat source which is sufficient to generate a steam using the heat exchanger 200 and the insulated tank 300 to be described later.

As long as reactants may cause an exothermic reaction, reactants and product which may be reacted in the reactor 100 are not particularly limited. For example, the heat recovery device 10 of the present application may be employed in a process for producing octanol such as 2-ethyl hexanol utilizing a GL reaction or a process for producing dioctyl terephthalate (DOTP) utilizing a reaction of dimethyl terephthalate and as 2-ethyl hexanol.

In one example, the stream discharged from the reactor 100 enters the heat exchanger 200 along the reactor outlet line 110. The stream discharged from the reactor 100 and flowing along the reactor outlet line 110 may be a stream containing gas-phase reactants (hereinafter referred to as a "gas-phase reactant stream"), and the gas-phase reactant stream may be heat-exchanged in the heat exchanger 200. For example, the gas-phase reactant stream may exchange heat with saturated water 301 stored in the insulated tank 300 or may exchange heat with a heat exchange medium, for example, condensed water, which flows along the heat exchanger inlet line 210, in the heat exchanger 200. The stream discharged from the reactor 100 and entering the heat exchanger 200 along the reactor outlet line 110 as described above exchanges heat with the saturated water 301 stored in the insulated tank 300 or with the heat exchange medium flowing along the heat exchanger inlet line 210 and may then re-enter the reactor 100 along the reactor inlet line 120. Therefore, the gas-phase reactant whose heat is transferred to the heat-exchange medium may be condensed, and the condensed reactants may re-enter the reactor 100 along the reactor inlet line 120 so that the condensed reactants may be used in the reaction.

Various kinds of the heat exchangers which have been known in the field of the heat exchanger field may be employed as the heat exchanger 200 in the heat recovery device 10 of the present application. For example, a shell and tube type heat exchanger, a spiral type heat exchanger or a plate type exchanger may be employed as the heat exchanger. In one example, in a case in which the reactant stream discharged from the batch reactor 100 along the reactor outlet line 110 contains a solid content, since this solid content may be accumulated in the above lines and the lines may be clogged, the shell and tube type heat exchanger or the spiral type heat exchanger may be employed. In addition, the plate type exchanger may be used for the reactant stream which does not contain a solid content.

As long as the heat exchange medium has a temperature difference capable of exchanging heat with the stream discharged from the reactor 100, the heat exchange medium is not particularly limited. For example, various kinds of heat exchange media which have been well-known in the art to which the present application pertains may be employed in the heat recovery device 10 of the present application. Preferably, condensed water, which may enter a storage tank which will be described later to produce a steam (hereinafter referred to as "condensed water"), may be used as the heat exchange medium.

The heat exchanger 200 may be installed at an inside or an outside of the insulated tank 300.

In one embodiment of the present application, the heat exchanger 200 may be installed at an outside of the insulated tank 300. In this case, the stream discharged from the reactor 100 may exchange heat with the heat exchange medium, which enters the heat exchanger 200, in the heat exchanger 200. For example, the stream discharged from the reactor 100 may enter the heat exchanger 200 along the reactor outlet line 110, and the stream entering the heat exchanger 200 from the reactor 100 may exchange heat with heat exchange medium, for example, condensed water entering the heat exchanger 200 along the heat exchanger inlet line 210. After the heat exchange as above, the stream discharged from the reactor 100 may re-enter the reactor 100 along the reactor inlet line 120. In addition, the heat exchange medium, which exchange heat with the stream as above, is discharged from the reactor 100 and may enter the insulated tank 300 along the insulated tank inlet line 330. In this case, the reactor outlet line 110 and the heat exchanger inlet line 210 are independent lines in which different fluids flow, and the heat exchanger outlet line 220 and the insulated tank inlet line 330 may be formed of one line. In other words, the reactor inlet line 120 and the reactor outlet line 110, that is, the reactor lines 110 and 120 may be regarded as one route or one path connected to the reactor to allow the stream discharged from the reactor 100 to pass through the reactor inlet line 120 and the reactor outlet line 110 and to re-enter the reactor 100. In addition, the heat exchanger inlet line 210 and the heat exchanger outlet line 220, that is, the heat exchanger line 210, 220 may be regarded as one route or one path connected to the heat exchanger to allow the stream entering the heat exchanger 200 along the heat exchanger inlet line 210 to be discharged from the heat exchanger 200 through the heat exchanger outlet line 220. Therefore, the reactor lines 110 and 120 and the heat exchanger line 210, 220 may be independently installed so as to prevent a fluid flowing in the reactor lines 110 and 120 and a fluid flowing in the heat exchanger line 210, 220 from being mixed with each other. Although not shown, in addition, each of the reactor lines 110 and 120 and the heat exchanger line 210, 220 may further include a pump for allowing the fluid to smoothly flow therein.

In one example, the heat exchange medium which exchanges heat and flows along the heat exchanger outlet line 220 or the insulated tank inlet line 330 may be gas-phase or liquid-phase stream. In one embodiment, if the heat exchange medium is the gas-phase stream, for example, a gas-phase steam, once the steam enters the insulated tank 300, latent heat of the steam is transferred to a liquid in the insulated tank 300 and the steam is thus condensed. Therefore, the saturated water 301 is existed in the insulated tank 300.

Figure 3:
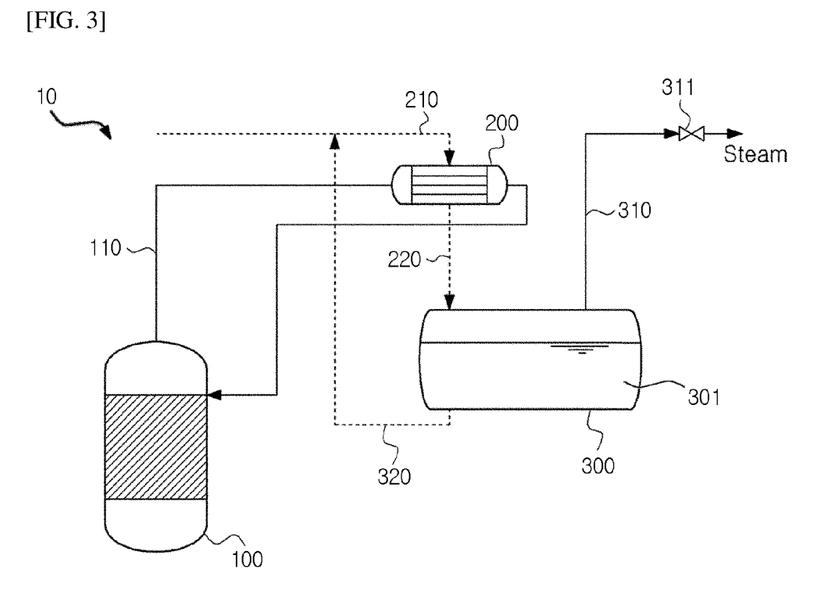
FIG. 3 is a view exemplarily showing another embodiment of a heat recovery device of the present application.

In another embodiment, the heat-exchanged heat exchange medium flowing along the heat exchanger outlet line 220 may be a liquid-phase stream, for example, liquid-phase condensed water. In this case, as shown in FIG. 3, the heat recovery device 10 may further include a circulation line 320 connected to the heat exchanger inlet line 210 from a lower end of the insulated tank 300. FIG. 3 is a view exemplarily showing another embodiment of the heat recovery device 10 of the present application.

In one embodiment, the saturated water 301 discharged from the lower end of the insulated tank 300 may enter the heat exchanger inlet line 210 along the insulated tank inlet line 330. Due to the above, a flow rate of a fluid flowing to the heat exchanger 200 is increased to enable the heat exchange to be performed well in the heat exchanger 200. The stream discharged from the reactor 100 and the heat exchange medium which is heat-exchanged in the heat exchanger 200 may enter the insulated tank 300 along the insulated tank inlet line 330, and the heat-exchanged heat exchange medium may transfer heat which is transferred from the gas-phase reactants to the saturated water 301 stored in the insulated tank 300 to produce the steam.

Figure 4:
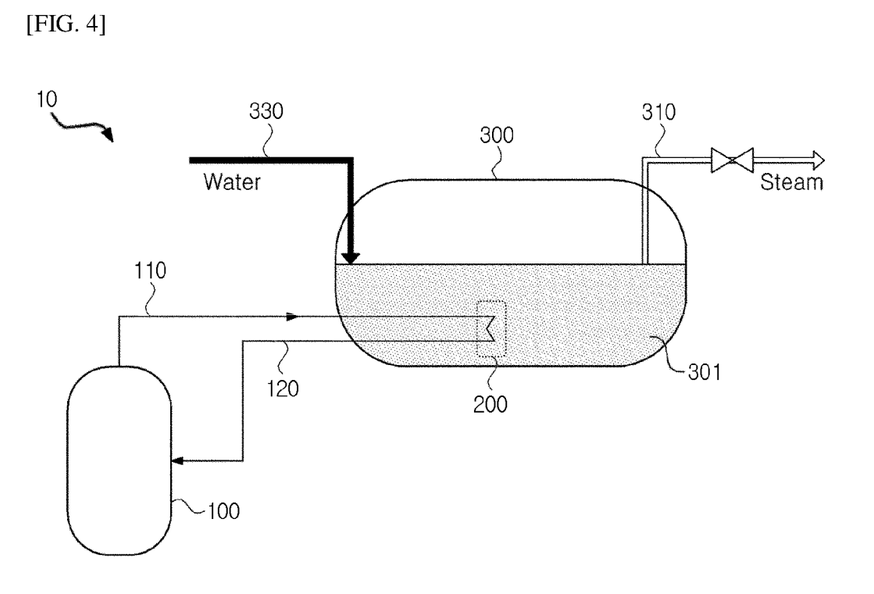
FIG. 4 is a view exemplarily showing further another embodiment of a heat recovery device of the present application.

In another embodiment of the present application, the heat exchanger 200 may be installed in the insulated tank 300. In this case, the stream discharged from the reactor 100 may exchange heat with the saturated water 301 stored in the insulated tank 300. FIG. 4 is a view exemplarily showing further another embodiment of the heat recovery device 10 of the present application.

As shown in FIG. 4, for example, the stream discharged from the reactor 100 may enter the insulated tank 300 along the reactor outlet line 110 and may exchange heat with the saturated water 301, which is stored in the insulated tank 300, in the heat exchanger 200 installed in the insulated tank 300. In this case, the reactor outlet line 110 may be installed in the insulated tank 300 to allow the reactor outlet line to be in direct contact with the saturated water 301. In a case in which the reactor outlet line 110 is in direct contact with the saturated water 301, the reactor outlet line 110 itself can act as the heat exchanger 200. Alternatively, the separate heat exchanger 200 may be installed at a place at which the reactor outlet line 110 is in contact with the saturated water 301. Meanwhile, after performing the heat exchange, the stream discharged from the reactor 100 may re-enter the reactor 100 along the reactor inlet line 120.

As described above, in a case in which the heat exchanger 200 is installed in the heat exchanger 200 or the stream discharged from the reactor 100 is in direct contact and exchange heat with the saturated water 301 stored in the insulated tank 300, the insulated tank 300 may include the insulated tank inlet line 330 to which the condensed water may be supplied from an outside. As will be described later, the insulated tank 300 may further include a steam discharge line 310 or the insulated tank outlet line 310, and the saturated water 301 in the insulated tank 300 may be discharged in the form of the steam through the steam discharge line 310 or the insulated tank outlet line 310. Therefore, the condensed water can be supplied to the insulated tank 300 through the insulated tank inlet line 330 to enable the steam to be continuously produced. The reactor outlet line 110 and the insulated tank inlet line 330 are independent lines in which different fluids flow, and the reactor lines 110 and 120 and the heat exchanger line 210, 220 are formed of one line or the reactor lines 110 and 120 itself may perform a function of the heat exchanger. In other words, the reactor inlet line 120 and the reactor outlet line, that is, the reactor lines 110 and 120 may be regarded as one route or one stream path connected to the reactor to allow the stream discharged from the reactor 100 to pass through the reactor inlet line 120 and the reactor outlet line 110 and to re-enter the reactor 100. In addition, the insulated tank inlet line 330 may be regarded as one route or one stream connected to the insulated tank to allow the condensed water to enter the insulated tank 300 along the insulated tank inlet line 330. Therefore, the reactor lines 110 and 120 and the insulated tank inlet line 330 may be independently installed so as to prevent a fluid flowing in the reactor lines 110 and 120 and a fluid flowing in the insulated tank inlet line 330 from being mixed with each other.

In one example, a temperature of the condensed water passing through the insulated tank inlet line 330 and entering the insulated tank 300 may be adjusted within various ranges according to a temperature of the saturated water 301 stored in the insulated tank 300. For example, the temperature of the condensed water may be 240° C., 120° C. to 180° C. or 160° C. to 240° C. However, the temperature of the condensed water is not limited to the above value.

In the heat recovery device according to the embodiments of the present application, in order that the heat exchange is performed well, a temperature of the stream entering the reactor 100 along the reactor inlet line 120 and the temperature of the saturated water 301 stored in the insulated tank 300 may be satisfied with the below general equation 1.

$$5°\ C. \leq T_{Rin} - T_{SW} \leq 70°\ C.$$ [General equation 1]

In the above General equation 1, $T_{Rin}$ represents the temperature of the stream entering the reactor 100, and $T_{SW}$ represents the temperature of the saturated water 301 stored in the insulated tank 300.

The difference ($T_{Rin}-T_{SW}$) between the temperature of the steam entering the reactor 100 and the temperature of the saturated water 301 stored in the insulated tank 300 may be 5° C. to 70° C., for example, 10° C. to 40° C., 20° C. to 40° C. or 30° C. to 35° C. If the temperature difference ($T_{Rin}-T_{SW}$) is adjusted within the above range, the stream discharged from the reactor 100 and entering the insulated tank 300 may possess the calorific value to enable the stream to be heat-exchanged with the saturated water 301 in the insulated tank 300 to produce a sufficient amount of the steam. For example, the temperature difference ($T_{Rin}-T_{SW}$) is below 5° C., the heat exchange may not occur. If the above temperature difference is above 70° C., a sufficient heat exchange does not occur so this temperature condition may be unfavorable to a waste heat recovery.

If the temperature of the stream entering the reactor 100 along the reactor inlet line 120 and the temperature of the saturated water 301 stored in the insulated tank 300 are satisfied with the above General equation 1, the temperatures of the stream and the saturated water are not particularly limited, but may be adjusted according to a variety of variables such as a kind of reactant in the reactor 100, reaction heat generated in the reactor 100, a pressure of the steam to be produced, the amount of the steam and the like. In one example, the temperature of the steam entering the reactor 100 along the reactor inlet line 120 may be 60° C. to 240° C., for example, 100° C. to 220° C., 120° C. to 200° C., 140° C. to 180° C., or 150° C. to 170° C., and the temperature of the saturated water 301 stored in the insulated tank 300 may be 120° C. to 240° C., for example, 120° C. to 200° C., 120° C. to 180° C., 120° C. to 160° C., 160° C. to 240° C. or 120° C. to 140° C.

A temperature of the heat exchange medium which enters the heat exchanger 200 along the heat exchanger inlet line 210 may be adjusted according to the temperature of the stream entering the reactor 100 along the reactor inlet line 120 and is not particularly limited. For example, the temperature of the heat exchange medium entering the heat exchanger 200 may be 110° C. to 200° C., for example, 110° C. to 150° C., 130° C. to 190° C., 150° C. to 200° C. or 120° C. to 200° C.

In order that the temperature of the stream entering the reactor 100 and the temperature of the saturated water 301 stored in the insulated tank 300 are satisfied with the above general equation 1, the temperature of the stream discharged from the reactor 100 may be properly adjusted. For example, the temperature of the stream discharged from the reactor may be 120° C. to 280° C., 140° C. to 200° C. or 150° C. to 180° C. However, this temperature is not limited to the above value.

In addition, if the heat exchanger 200 is installed at an outside of the insulated tank 300, the temperature of the heat-exchanged heat exchange medium entering the insulated tank 300 may be adjusted within various ranges according to the temperature of the stream entering the reactor 100 and the temperature of the saturated water 301 stored in the insulated tank 300. For example, the temperature of the heat exchange medium may be 120° C. to 240° C., 140° C. to 200° C. or 150° C. to 180° C. However, this temperature is not limited to the above value.

In one embodiment of the present application, the condensed water or the heat-exchanged heat exchange medium can enter the insulated tank 300 along the insulated tank inlet line 330

The insulated tank 300 means a reservoir or a tank in which the saturated water 301 is stored, with the reservoir or the tank being subjected to adiabatic treatment. For example, if the heat-changed heat exchange medium enters the insulated tank, the heat exchange medium supplies the energy to water stored in the insulated tank. In this case, since the tank is adiabatically insulated and a volume of the tank cannot be varied, internal temperature and pressure of the tank are gradually increased so that water in the tank does not boil at the temperature of 100° C. or more. In addition, water in the tank reaches a saturation state and water is thus maintained in the form of the saturated water 31.

In one example, the temperature of the saturated water 301 may be adjusted within various ranges according to the temperature of the condensed water or the heat-exchanged heat exchange medium entering the insulated tank along the insulated tank inlet line 330. For example, the temperature of the saturated water may be 120° C. to 240° C., 120° C. to 200° C., 120° C. to 180° C., 160° C. to 240° C., 120° C. to 160° C. or 120° C. to 140° C. However, the temperature of the saturated water is not limited to the above value.

In one embodiment, the insulated tank 300 further includes the steam discharge line 310 or the insulated tank outlet line 310. The steam discharge line 310 is a path through which the steam produced in the tank is discharged. In one example, the steam discharge line 310 may be provided with a pressure drop control device 311, for example, a pressure drop control valve 311. An internal pressure of the tank may be adjusted by the pressure drop control valve 311. For example, in a case in which the internal pressure of the tank is lowered by adjusting the pressure drop control valve 311, the saturated water 301, which is the water condensed even at the temperature of 100° C. or more, is evaporated. The steam produced by the above re-evaporation phenomenon may be discharged along the steam discharge line 310. The calorific value stored in water in the form of the sensible heat is converted into the latent heat by a pressure drop so that the steam is produced in the insulated tank 300. Therefore, the amount of the steam is proportional to a difference between the temperature of the line in the tank and the temperature of the steam discharge line 310 and this steam may be stored. In the above description, the term "sensible heat" means the heat which does not change a state of objet, but changes only an internal energy of the object, and the term "latent heat" means the heat used for changing a state of object.

In one example, the temperature of the stream flowing along the steam discharge line 310 and the temperature of the stream entering the insulated tank 300 along the insulated tank inlet line 330 may be satisfied with the below general equation 2.

$$10° C. \leq T_{Sout} - T_{Tin} \leq 200° C.$$ [General equation 2]

In the above General equation 2, $T_{Sout}$ represents the temperature of the stream flowing along the steam discharge line 310 and $T_{Tin}$ represents the temperature of the stream entering the insulated tank 300 along the insulated tank inlet line 330.

The difference ($T_{Sout} - T_{Tin}$) between the temperature of the steam flowing along the steam discharge line 310 and the temperature of the stream entering the insulated tank 300 along the insulated tank inlet line 330 may be above 10° C., for example, above 20° C., above 30° C. or above 40° C. If the temperature difference ($T_{Sout} - T_{Tin}$) is adjusted to the value of above 10° C., it is possible to transfer the calorific value, which is sufficient for producing the steam, to the water in the tank. Since the amount of the steam to be produced may be proportional to the difference between the temperature of the steam flowing along the steam discharge line 310 and the temperature of the stream entering the insulated tank 300 along the insulated tank inlet line 330, the upper limit of $T_{Sout} - T_{Tin}$ is not particularly limited, but $T_{Sout} - T_{Tin}$ may be adjusted to the value of below 200° C. in view of the economical process.

As described above, the stream entering the insulated tank 300 along the insulated tank inlet line 330 may be the stream of condensed water or the heat-exchanged heat exchange medium. For example, if the heat exchanger 200 is installed in the insulated tank 300, the stream entering the insulated tank 300 may be the stream of condensed water. In addition, if the heat exchanger 200 is installed at an outside of the insulated tank 300, the stream entering the insulated tank 300 may be the stream of the heat exchange medium which exchanges heat in the heat exchanger 200 and is then discharged from the heat exchanger, or may be the stream of condensed water which exchange heat.

In one example, if the temperature of the steam discharged along the steam discharge line 310 satisfies the General equation 1, the temperature of this steam is not particularly limited. For example, the temperature of this steam may be 110° C. to 230° C., 110° C. to 200° C. or 110° C. to 150° C. In addition, in order to adjust the temperature of the steam discharge line 310 to the value which satisfies the condition of the General equation 2, a pressure of the steam discharged along the steam discharge line 310 may be adjusted within various ranges. For example, the pressure of this steam may be 1.5 to 30.0 kgf/cm², 0.5 to 5.0 kgf/cm², 2.0 to 6.0 kgf/cm², 5.0 to 15.0 kgf/cm² or 10.0 to 20.0 kgf/cm², the pressure of this steam is not limited to the above.

In one embodiment, the heat recovery device 10 may further include a control unit for controlling the pressure and/or a production amount of the steam. The control unit may include a measuring part for measuring a stream pressure of the steam discharge line 310 and an adjusting part for properly adjusting an opening/closing degree of a valve according to the stream pressure measured by the measuring part. Therefore, the pressure and the production amount of the steam discharged from the insulated tank may be appropriately adjusted according to a degree of request of a consumer. Due to the control unit, it is possible to continuously produce the steam from waste heat which is discontinuously generated in the batch reactor 100.

In addition, although not shown in the drawings, the heat recovery device 10 may further include a steam storage tank connected to the steam discharge line 310.

In one example, the energy to be stored in the insulated tank 300, that is, a storage amount of the steam which may be produced from the steam discharge line 310 is calculated by the following General equation 3.

Production amount of steam per 1 kg of stored water=$(H_{W1}-H_{W2})/H_v$ [General equation 3]

In the above General equation 3, $H_{W1}$ represents an enthalpy (kJ/kg) of the condensed water entering the insulated tank 330, $H_{W2}$ represents an enthalpy (kJ/kg) of the steam discharged to the steam discharge line 310, and $H_v$ represents a vaporization heat (kJ/kg) of the steam.

For example, if a temperature of the insulated tank inlet line 330 is 190° C. and a temperature of the steam discharge line 310 is 130° C., a generation amount of the steam may be calculated as below.

[(190° C.–130° C.)×4.2(Kcal/KJ)]/2173.7(KJ/Kg steam)=0.116(kg)  [Calculation formula]

In other words, the steam of 0.116 kg per water of 1 kg can be stored, the steam of 11.6 ton can be stored in the insulated tank having a volume of 100 m³ and it is possible to supply the stored steam to an installation which requires the heat source.

The present application also provides a heat recovery method using the heat recovery device 10 described above. As described above, according to the heat recovery method of the present application, after a heat source which is discarded in a chemical process facility such as the batch reactor 100 is continuously or discontinuously stored in the insulated tank 300, the heat source may be continuously or discontinuously and stably supplied to an installation requiring a heat source. Thus, the heat source which has been conventionally discarded, is recyclable. In addition, the waste heat source can be used in a variety of chemical process facilities to obtain the energy saving effect.

The heat recovery method includes a heat-exchanging step and a re-introducing step. In the heat-exchanging step, the stream discharged from the reactor 100 and entering the heat exchanger 200 along the reactor outlet line 110 may exchange heat with the saturated water 301 stored in the insulated tank 300 or with the heat exchange medium, for example, condensed water flowing along the heat exchanger inlet line 210. Since the structures of the batch reactor 100, the heat exchanger 200 and the heat exchange medium are the same as those of the heat recovery device 10 described above, the detail description thereon is omitted.

The re-introducing step is the step for re-introducing the stream, which is discharged from the batch reactor 100 and exchange heat with the saturated water 301 or the heat exchange medium, to the batch reactor 100. Here, the heat-exchanged stream may re-introduce the reactor 100 along the reactor inlet line 120. Therefore, gas-phase reactants transferring heat to the heat exchanger medium may be condensed, the condensed reactant re-introduces the reactor 100 along the reactor inlet line 120 so that the condensed reactants may be used in the reaction.

In one example, the method of the present application may further include a step of entering the heat-exchanged heat exchange medium to the insulated tank 300. The heat-exchanged heat exchange medium may transfer the heat transferred from the gas-phase reactants to the saturated water 301 stored in the insulated tank 300 to produce the steam.

In order to allow the heat exchange to be performed well through the heat exchanger 200, in one example, the method of the present application may further include adjusting a temperature of the stream entering the reactor 100 and a temperature of the saturated water 301 stored in the insulated tank 300 to allow these temperature to satisfy the following General equation 1.

$5°\ C. \leq T_{Rin} - T_{SW} \leq 70°\ C.$  [General equation 1]

In the above General equation 1, $T_{Rin}$ represents the temperature of the stream entering the reactor 100, and $T_{SW}$ represents the temperature of the saturated water 301 stored in the insulated tank 300.

The difference ($T_{Rin} - T_{SW}$) between the temperature of the steam entering the reactor 100 and the temperature of the saturated water 301 stored in the insulated tank 300 may be 5° C. to 70° C., for example, 10° C. to 40° C., 20° C. to 40° C. or 30° C. to 35° C. If the temperature difference ($T_{Rin} - T_{SW}$) is adjusted within the above range, the stream discharged from the reactor 100 and entering the insulated tank 300 may possess the calorific value to enable the stream to be heat-exchanged with the saturated water 301 in the insulated tank 300 to produce a sufficient amount of the steam.

Since the temperature of the stream discharged from the reactor 100 and the temperature of the saturated water 301 stored in the insulated tank 300 or of the heat-exchanged heat exchange medium entering the insulated tank 300 are the same as those in the description on the heat recovery device 10 which is already described, the detail description thereon is omitted.

The method of the present application may further include discharging the steam from an upper portion of the insulated tank 300.

In this case, the temperature of the steam discharged from the upper portion of the insulated tank 300 and the temperature of the condensed water or the heat-exchanged heat exchange medium entering the insulated tank 300 may satisfy the following General equation 2.

$10°\ C. \leq T_{Sout} - T_{Tin} \leq 200°\ C.$  [General equation 2]

In the above General equation 2, $T_{Sout}$ represents the temperature of the stream discharged from an upper portion of the insulated tank 300, and $T_{Tin}$ represents the temperature of the condensed water or the heat-exchanged heat exchange medium entering the insulated tank 300.

The difference ($T_{Sout} - T_{Tin}$) between the temperature of the steam discharged from the upper portion of the insulated tank 300 and the temperature of the condensed water or the heat-exchanged heat exchange medium entering the insulated tank 300 may be above 10° C., for example, above 20° C., above 30° C. or above 40° C. If the temperature difference ($T_{Sout} - T_{Tin}$) is adjusted to the value of above 10° C., it is possible to transfer the calorific value, which is sufficient for producing the steam, to the water in the tank.

Since the details regarding the temperature of the steam discharged from the upper portion of the insulated tank 300 and the temperature of the condensed water entering the insulated tank 300 or the heat-exchanged heat exchange medium are the same as those in the description of the heat recovery device 10 described as above, the description thereon is omitted.

In one example, the method of the present application may further include controlling the pressure and/or a production amount of the steam. Therefore, the pressure and the production amount of the steam discharged from the insulated tank may be appropriately adjusted according to a degree of request of a consumer. Due to the control unit, it is possible to continuously produce the steam from waste heat which is discontinuously generated in the batch reactor 100.

Advantageous Effect

According to the heat recovery device according to the present application, it is possible to recovery the heat which is discontinuously generated in the batch reactor and the heat-exchanged heat exchange medium is supplied to the heat storage facility so that various kinds and a great quantity of steams can be produced, if necessary, to utilize these steams in various industrial fields.

BEST MODE FOR CARRYING OUT THE INVENTION

Hereinafter, the device and the method of the present application are described in detail with reference to the examples and the comparative example. However, the device and the method of the present application are not limited to the below examples.

Example 1

Heat was recovered by means of the heat recovery device in which the heat exchanger was installed at an outside of the insulated tank as in FIG. 3. Specifically, the gas-phase reactant stream having a temperature of 165° C. and discharged from the batch reactor entered the heat exchanger. Separately, the condensed water of 115° C. and 4.8 kgf/cm$^2$ entered the heat exchanger through the inlet line and the gas-phase reactant stream, which entered the heat exchanger, exchanged heat with the condensed water in the heat exchanger. The heat-exchanged reactant stream was condensed and then re-introduced into the batch reactor under the condition of a temperature of 163° C. Meanwhile, the heat-exchanged condensed water, which was under the condition of 160° C. and 4.8 kgf/cm$^2$, entered the insulated tank in which the saturated water having a temperature of approximately 130° C., and a valve installed on the steam discharge line of the insulated tank was opened to decrease a pressure in the insulated tank and discharge the steam which was under the condition of approximately 120° C. and 2 kgf/cm$^2$. In addition, the saturated water, which was under the condition of approximately 130° C. and 5 kgf/cm$^2$, was discharged from a lower portion of the insulated tank, and was then mixed with the condensed water, which was under the condition of 115° C. and 4.8 kgf/cm$^2$ and entered the heat exchanger. Then, the saturated water and the condensed water entered the heat exchanger.

Example 2

Heat was recovered by means of the heat recovery device configured to allow the stream discharged from the reactor to directly exchange heat with the saturated water in the insulated tank as in FIG. 4. Specifically, the gas-phase reactant stream, which had a temperature of 165° C. and was discharged from the batch reactor, entered the heat exchanger installed in the insulated tank in which the saturated water having a temperature of approximately 130° C. was stored, and a pipeline in which the gas-phase reactant stream flowed was in direct with the saturated water through the heat exchanger to allow the reactant stream to exchange heat with the saturated water. The heat-exchanged reactant stream was condensed and then re-entered the batch reactor under the condition of a temperature of 163° C., and the valve installed on the steam discharge line of the insulated tank was opened to decrease a pressure in the insulated tank and discharge the steam which was under the condition of approximately 120° C. and 2 kgf/cm$^2$.

Comparative Example

Figure 5:
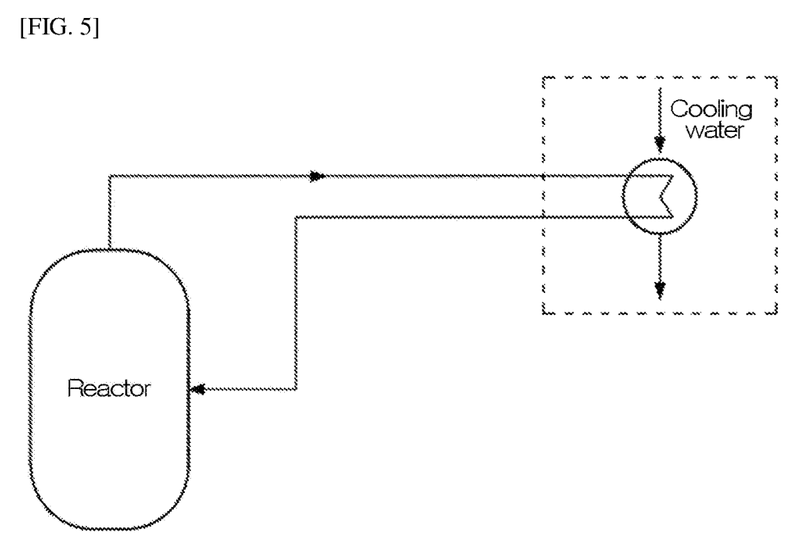
FIG. 5 is a view showing an device according to the comparative example.

The gas-phase reactant stream which had a temperature of 180° C. and was discharged from the batch reactor as shown in FIG. 5 was cooled by cooling water having a temperature of approximately 35° C. and was then condensed to a temperature of approximately 178° C. Subsequently, the condensed stream re-entered the batch reactor.

Experimental Example—Performing a Simulation Experiment

Figure 6:
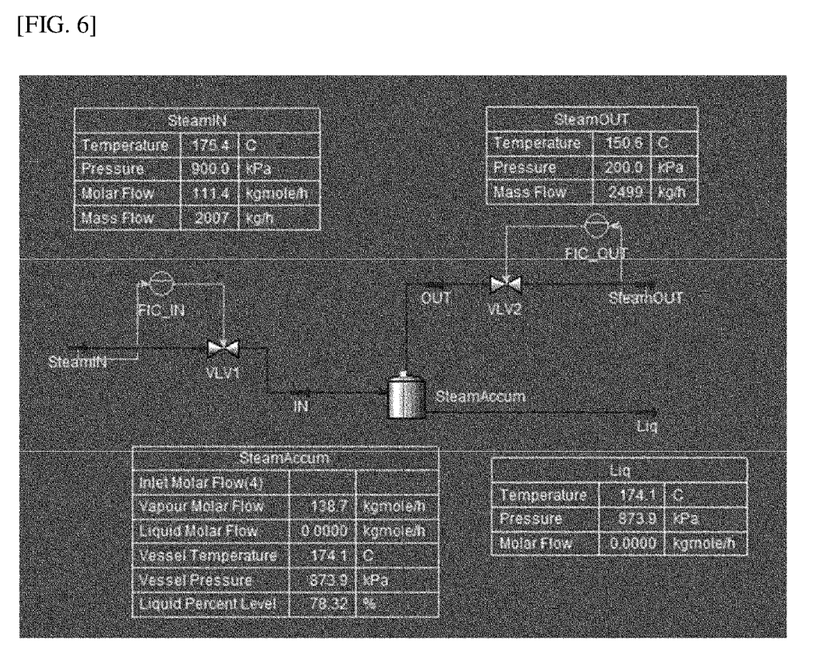
FIG. 6 is a view showing a heat recovery process of the present application.
Figure 7:
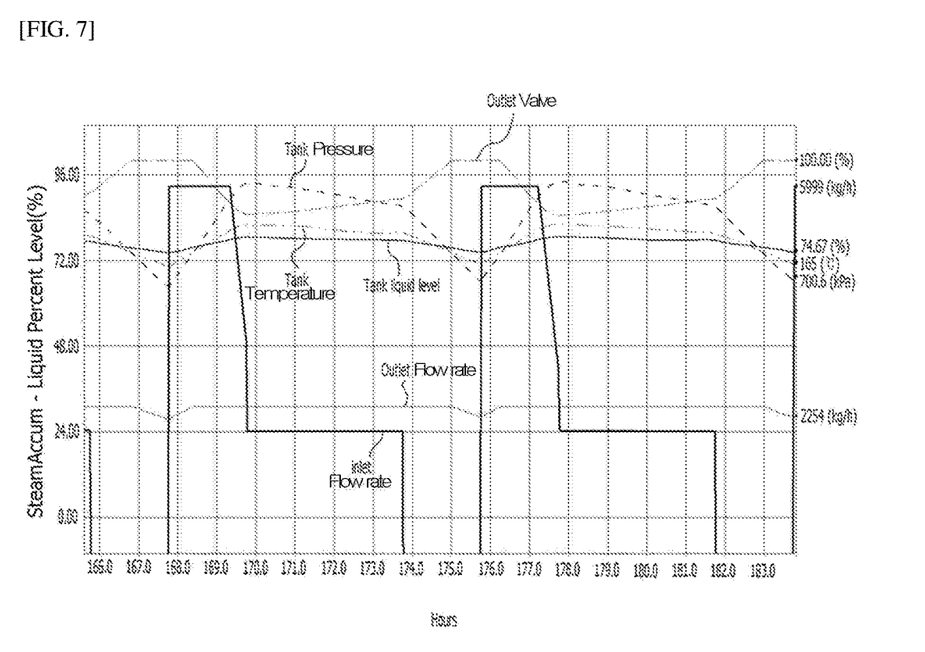
FIG. 7 is a graph showing variations of an opening/closing degree of a valve, the amount of saturated water in a tank, an internal temperature of the tank, an internal pressure of the tank, a flow rate of steam according to a heat recovery process time and a flow rate of stream of gas-phase reactants discharged from a batch reactor in one embodiment of the present application.

In order to more accurately find out the process time, an opening/closing degree of the valve according to a flow rate of the gas-phase reactant stream discharged from the batch reactor, the amount of the saturated water in the tank, the internal temperature of the tank, the internal pressure of the tank and the amount of the steam in the above embodiments, the process simulation experiment as shown in FIG. 6 was carried out under a dynamic condition using the Aspen HYSYS, the experiment results were shown in FIG. 7.

It can be found that, as shown in FIG. 7, the amount of the saturated water in the water, the internal temperature and the internal pressure of the tank were increased at the time period between approximately 167.7 hours and 169.8 hours during which the flow rate of the gas-phase reactant stream discharged from the batch reactor was explosively increased, and the amount of the reactant stream was gradually decreased from the time between approximately 170 hours and 173.8 hours to the time at which the reaction was finished so that the amount of the saturated water in the tank, the internal temperature and the internal pressure of the tank were also gradually decreased. However, it can be found that the amount of the gas-phase reactant stream was disappeared between approximately 174 hours and 175.8 hours during which, after finishing the reaction, the reaction was halted until the next operation so that waste heat was discontinuously produced. In this case, it can be found that even though the amount of the saturated water in the tank, the internal temperature and the internal pressure of the tank were rapidly decreased, the steam was continuously produced so that it is possible to continuously produce the steam using the waste heat which was discontinuously generated.

The invention claimed is:

1. A heat recovery device, comprising an insulated tank in which saturated water is stored, a reactor and a heat exchanger, each of which comprises an inlet line and an outlet line, wherein a stream discharged from the reactor enters the heat exchanger along the outlet line of the reactor and is heat-exchanged with the saturated water or a heat exchange medium entering the heat exchanger, and the stream then enters the reactor along the inlet line of the reactor, wherein the reactor is a batch reactor which discontinuously generates a heat source.

2. The heat recovery device of claim 1, wherein the stream discharged from the reactor is heat-exchanged with the heat exchange medium, and wherein the heat exchange medium is condensed water.

3. The heat recovery device of claim 1, wherein the heat exchanger is installed at an inside or an outside of the insulated tank.

4. The heat recovery device of claim 3, wherein the heat exchanger is installed at an outside of the insulated tank, the stream discharged from the reactor enters the heat exchanger along the outlet line of the reactor and is heat-exchanged with the heat exchange medium entering the heat exchanger along the inlet line of the heat exchanger, the stream then enters the reactor along the inlet line of the reactor, and the heat exchange medium after heat exchange enters the insulated tank along the inlet line of the insulated tank.

5. The heat recovery device of claim 3, wherein the heat exchanger is installed inside of the insulated tank in which the saturated water is stored, the stream discharged from the reactor enters the heat exchanger along the outlet line of the reactor and is heat-exchanged with the saturated water stored in the insulated tank, the stream then re-enters the reactor along the inlet line of the reactor.

6. The heat recovery device of claim 4, wherein a temperature of the stream entering the reactor and a temperature of the saturated water stored in the insulated tank satisfy the following General equation 1:

$$5° C. \leq T_{Rin} - T_{SW} \leq 70° C. \quad \text{[General equation 1]}$$

wherein, $T_{Rin}$ represents the temperature of the stream entering the reactor, and $T_{SW}$ represents the temperature of the saturated water stored in the insulated tank.

7. The heat recovery device of claim 6, wherein the stream entering the reactor is a stream of a condensed reactant.

8. The heat recovery device of claim 5, wherein the condensed water enters the insulated tank along the inlet line of the insulated tank.

9. The heat recovery device of claim 1, wherein the stream discharged from the reactor is a stream of a gas-phase reactant.

10. The heat recovery device of claim 4, wherein the heat exchange medium after heat exchange is a stream of liquid-phase condensed water, and the device further comprises a circulation line connected to the inlet line of the heat exchanger from a lower portion of the insulated tank, and the saturated water discharged from the lower portion of the insulated tank enters the heat exchanger inlet line along the circulation line.

11. The heat recovery device of claim 4, wherein the insulated tank further comprises a steam discharge line.

12. The heat recovery device of claim 11, wherein a temperature of the stream flowing along the steam discharge line and a temperature of the stream entering the insulated tank along the inlet line of the insulated tank satisfy the following General equation 2:

$$10° C. \leq T_{Sout} - T_{Tin} \leq 200° C. \quad \text{[General equation 2]}$$

wherein, $T_{Sout}$ represents the temperature of the stream flowing along the steam discharge line, and $T_{Tin}$ represents the temperature of the stream entering the insulated tank along the inlet line of the insulated tank.

13. The heat recovery device of claim 11, further comprising a control unit configured to control a pressure and/or a production amount of the steam.

14. A heat recovery method, comprising;
introducing a stream discharged from a batch reactor to a heat exchanger and heat-exchanging with saturated water stored in an insulated tank or heat exchange medium entering the heat exchanger; and
re-introducing the stream, which is discharged from the batch reactor and heat-exchanged with the saturated water or the heat exchanged medium to the batch reactor.

15. The heat recovery method of claim 14, wherein the stream discharged from the batch reactor to the heat exchanger is heat-exchanged with the heat exchange medium, wherein the heat exchange medium is condensed water.

16. The heat recovery method of claim 14, further comprising introducing the condensed water or the heat exchange medium after heat exchange to the insulated tank.

17. The heat recovery method of claim 16, wherein a temperature of the stream entering the reactor and a temperature of the saturated water stored in the insulated tank satisfy the following General equation 1:

$$5° C. \leq T_{Rin} - T_{SW} \leq 70° C. \quad \text{[General equation 1]}$$

wherein, $T_{Rin}$ represents the temperature of the stream entering the reactor and $T_{SW}$ represents the temperature of the saturated water stored in the insulated tank.

18. The heat recovery method of claim 16, further comprising discharging steam from an upper portion of the insulated tank.

19. The heat recovery method of claim 18, wherein a temperature of the steam discharged from the upper portion of the insulated tank and a temperature of the condensed water or the heat-exchanged heat exchange medium entering the insulated tank satisfy the following General equation 2:

$$10° C. \leq T_{Sout} - T_{Tin} \leq 200° C. \quad \text{[General equation 2]}$$

wherein, $T_{Sout}$ represents the temperature of the steam discharged from the upper portion of the insulated tank and $T_{Tin}$ represents the temperature of the condensed water or the heat-exchanged heat exchange medium entering the insulated tank.

* * * * *